(12) United States Patent
Yang et al.

(10) Patent No.: US 12,140,562 B2
(45) Date of Patent: Nov. 12, 2024

(54) MICROORGANISM DETECTION APPARATUS USING DIELECTROPHORESIS FORCE

(71) Applicant: GIST (Gwangju Institute of Science and Technology), Gwangju (KR)

(72) Inventors: Sung Yang, Gwangju (KR); Taek Eon Jeong, Busan (KR); Jae Hyeon Ahn, Busan (KR); Yu Gyung Jung, Busan (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 0 days.

(21) Appl. No.: 17/380,703

(22) Filed: Jul. 20, 2021

(65) Prior Publication Data

US 2022/0018807 A1 Jan. 20, 2022

(30) Foreign Application Priority Data

Jul. 20, 2020 (KR) .......................... 10-2020-0089776

(51) Int. Cl.
*G01N 27/447* (2006.01)
(52) U.S. Cl.
CPC .............................. *G01N 27/44786* (2013.01)
(58) Field of Classification Search
CPC ............. G01N 27/44786; B03C 5/005; B01L 2400/0424
See application file for complete search history.

(56) References Cited

U.S. PATENT DOCUMENTS

| | | | | |
|---|---|---|---|---|
| 8,293,089 | B1* | 10/2012 | James | B03C 1/288 204/660 |
| 2011/0290649 | A1* | 12/2011 | Hamada | B03C 5/005 204/547 |
| 2012/0118740 | A1* | 5/2012 | Garcia | G01N 15/00 204/547 |
| 2018/0031480 | A1* | 2/2018 | Sinclair | G01N 21/6428 |

FOREIGN PATENT DOCUMENTS

| | | |
|---|---|---|
| JP | 2001-165906 A | 6/2001 |
| JP | 2004-513375 A | 4/2004 |
| KR | 10-2010-0026270 A | 3/2010 |
| KR | 10-2018-0033711 A | 4/2018 |
| KR | 10-2020-0011456 A | 2/2020 |

OTHER PUBLICATIONS

H. Zhang, DEP-on-a-Chip: Dielectrophoresis Applied to Microfluidic Platforms, Micromachines, 2019 (10, 423), p. 1-22. (Year: 2019).*

(Continued)

*Primary Examiner* — C. Sun
(74) *Attorney, Agent, or Firm* — Studebaker & Brackett PC

(57) ABSTRACT

The present disclosure relates to a microorganism detection apparatus using a dielectrophoresis (DEP) force. A microorganism detection apparatus according to one embodiment of the present disclosure may include a detection unit that detects microbial particles using a DEP force corresponding to latex particles combined with the microbial particles.

11 Claims, 11 Drawing Sheets

(56) References Cited

OTHER PUBLICATIONS

J. Wu, 3D-printed microfluidic manipulation device integrated with magnetic array, Microfluidics and Nanofluidics, 2018(22:103), p. 1-11. (Year: 2018).*
Pethig, Dielectrophoresis Theory, Methodology and Biological Applications, First Edition, 2017. (Year: 2017).*
K. Zhao, Continuous Cell Characterization and Separation by Microfluidic Alternating Current Dielectrophoresis, Anal. Chem. 2019(91), p. 6304-6314. (Year: 2019).*
An Office Action mailed by the Korean Intellectual Property Office on Oct. 26, 2021, which corresponds to Korean Patent Application No. 10-2020-0089776.
A Notice of Allowance mailed by the Korean Intellectual Property Office on Apr. 6, 2022, which corresponds to Korean Patent Application No. 10-2020-0089776.
C M Yousuff et al., Microfluidic Platform for Cell Isolation and Manipulation Based on Cell Properties, Micromachines, book, 2017, 8, 15, Dec. 31, 2017, pp. 1-15 (submitted 26 pages total).

* cited by examiner

MICROORGANISM DETECTION APPARATUS USING DIELECTROPHORESIS FORCE

CROSS-REFERENCE TO RELATED APPLICATION

This application claims priority to and the benefit of Korean Patent Application No. 10-2020-0089776 filed on Jul. 20, 2020, the disclosure of which is incorporated herein by reference in its entirety.

BACKGROUND

1. Field of the Invention

The present disclosure relates to a microorganism detection apparatus, and more particularly, to a microorganism detection apparatus using a dielectrophoresis (DEP) force.

2. Discussion of Related Art

Conventional procedures used to detect microorganisms typically include culturing a sample. In this case, target microorganisms may be cultured in a culture medium specific to such target microorganisms. In the case of the most commonly used cultivation method, since microbial cultivation requires 24 hours or more, there is a problem that it takes a long time.

Further, immunochromatography and RT-PCR also consume a lot of time for detection, and when the concentration of microorganism is low using a small amount of sample, accurate detection is difficult, and there is a high possibility that erroneous results occur.

Thus, the need for accurate detection of microorganisms has been raised, but research thereon is insufficient.

RELATED ART DOCUMENT

Patent Document

Patent Document 1: Korean Patent Application Publication No. 10-2020-0011456

SUMMARY OF THE INVENTION

The present disclosure is directed to providing a microorganism detection apparatus using a dielectrophoresis (DEP) force.

The present disclosure is also directed to providing an apparatus for detecting microbial particles using the DEP force corresponding to latex particles combined with the microbial particles.

The purposes of the present disclosure are not limited to the purpose described above, and those skilled in the art will clearly understand other purposes, which are not described, from the following description.

A microorganism detection apparatus according to one embodiment of the present disclosure includes a detection unit that detects microbial particles using a dielectrophoresis (DEP) force corresponding to latex particles combined with the microbial particles.

The detection unit may include: an injection unit that injects a sheath solution containing the microbial particles combined with the latex particles; a detection channel that moves the microbial particles combined with the latex particles contained in the sheath solution; and an electrode unit that has an alternating current (AC) signal applied thereto and generates the DEP force corresponding to the latex particles according to a frequency of the AC signal, thereby capturing the microbial particles.

The detection unit may further include a control unit that calculates at least one of a type and a concentration of microorganisms using a current value of the electrode unit due to the captured microbial particles.

One end of the detection channel may be coupled to the injection unit, the other end of the detection channel may be coupled to the electrode unit, and a width of the detection channel may increase in a direction from the one end of the detection channel to the other end of the detection channel.

The microbial particles may be combined with the latex particles and magnetic particles and move along one side surface of the detection channel due to a magnetic force acting on the magnetic particles.

The microorganism detection apparatus may further include a concentration unit that concentrates the microbial particles combined with the latex particles and transfers the concentrated microbial particles to the detection unit.

The concentration unit may include: a first injection unit that injects a microbial sample containing the microbial particles combined with the latex particles and magnetic particles and a sample solution; a second injection unit that injects a sheath solution; a concentration channel that moves the microbial particles to the sheath solution by the magnetic particles; a first discharge unit that transfers, to the detection unit, the sheath solution containing the microbial particles combined with the latex particles and the magnetic particles; and a second discharge unit that discharges the sample solution.

The concentration unit may further include a magnet member that generates a magnetic force which acts on the magnetic particles, and the microbial particles may move along one side surface of the concentration channel due to the magnetic force acting on the magnetic particles.

Specific details for achieving the above purposes will become apparent with reference to embodiments, which will be described below in detail, together with the accompanying drawings.

However, the present disclosure is not limited to the embodiments described below, but may be configured in various different forms, and is provided to make the disclosure of the present disclosure complete and to completely inform the scope of the disclosure to those skilled in the art (hereinafter, an "ordinary engineer) to which the present disclosure pertains.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
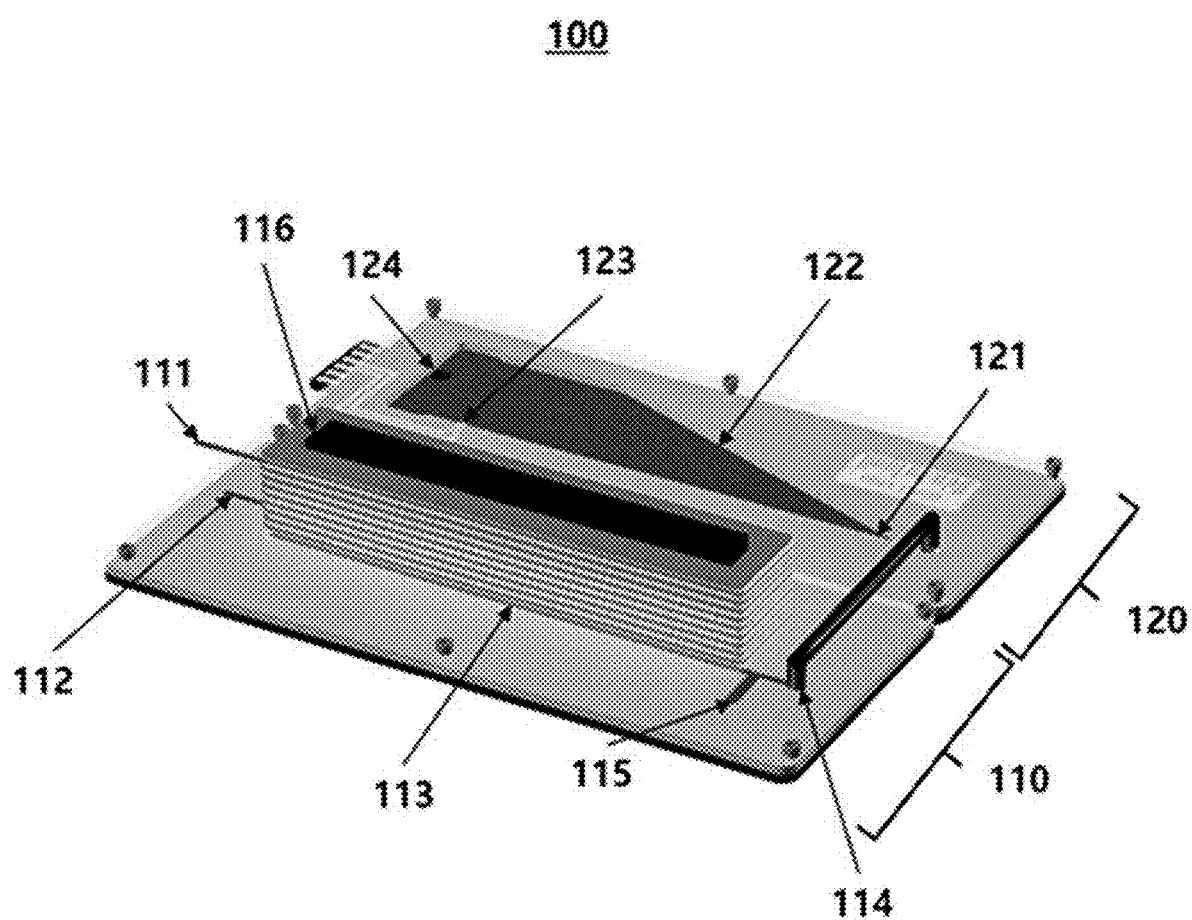
FIG. 1 is a view illustrating a microorganism detection apparatus according to one embodiment of the present disclosure.

Since the present disclosure may undergo various changes and have various embodiments, specific embodiments will be illustrated in the drawings and described in detail.

Various features of the disclosure described in the appended claims may be better understood in consideration of the drawings and detailed description. Apparatuses, methods, preparation methods, and various embodiments disclosed in the specification are provided for illustrative purposes. The disclosed structural and functional features are intended to enable those skilled in the art to specifically implement various embodiments and are not intended to limit the scope of the disclosure. The disclosed terms and sentences are intended to describe various features of the present disclosure in an easily understandable manner but are not intended to limit the scope of the disclosure.

In the description of the present disclosure, when it is determined that the detailed description of widely known related technologies may make the subject matter of the present disclosure unclear, the detailed description will be omitted.

Hereinafter, a microorganism detection apparatus using a dielectrophoresis (DEP) force according to one embodiment of the present disclosure will be described.

FIG. 1 is a view illustrating a microorganism detection apparatus 100 according to one embodiment of the present disclosure.

Referring to FIG. 1, the microorganism detection apparatus 100 may include a concentration unit 110 and a detection unit 120.

The concentration unit 110 may concentrate microbial particles combined with latex particles and transfer the concentrated microbial particles to the detection unit 120. In the embodiment, the microbial particles may be further combined with magnetic particles as well as the latex particles.

In the embodiment, the concentration unit 110 may include a first injection unit 111, a second injection unit 112, a concentration channel 113, a first discharge unit 114, a second discharge unit 115, and a magnetic member 116.

The first injection unit 111 may inject a microbial sample containing the microbial particles combined with the latex particles and the magnetic particles and a sample solution. The second injection unit 112 may inject a sheath solution.

The concentration channel 113 may move the microbial particles to the sheath solution by the magnetic particles.

The first discharge unit 114 may transfer, to the detection unit 120, the sheath solution containing the microbial particles combined with the latex particles and the magnetic particles. The second discharge unit 115 may discharge the sample solution excluding the microorganism to the outside.

The magnetic member 116 may generate a magnetic force on the magnetic particles combined with the microbial particles. Accordingly, the microbial particles may move along one side surface of the concentration channel 113 by the magnetic force acting on the magnetic particles.

The detection unit 120 may detect the microbial particles using the DEP force corresponding to the latex particles combined with the microbial particles transferred from the concentration unit 110.

In the embodiment, the detection unit 120 may include an injection unit 121, a detection channel 122, an electrode unit 123, and a discharge unit 124.

The injection unit 121 may inject the sheath solution containing the microbial particles combined with the latex particles and transferred from the concentration unit 110.

The detection channel 122 may move the microbial particles combined with the latex particles included in the sheath solution. One end of the detection channel 122 may be coupled to the injection unit 121, and the other end of the detection channel 122 may be coupled to the electrode unit 123. In this case, the width of the detection channel 122 may increase in a direction from the one end to the other end of the detection channel 122.

In the embodiment, the microbial particles are combined with the latex particles and the magnetic particles and may move along one side surface of the detection channel 122 by a magnetic force acting on the magnetic particles by the magnetic member 116.

The electrode unit 123 may have an alternating current (AC) signal applied thereto and generate the DEP force corresponding to the latex particles according to the frequency of the AC signal, thereby capturing the microbial particles. In one embodiment, the electrode unit 123 may include at least one of an electrode and a measurement sensor. One or more electrodes for detecting microorganisms may be manufactured.

The discharge unit 124 may discharge the materials other than the captured microbial particles to the outside.

A controller (not illustrated) may calculate at least one of the type and the concentration of the microorganisms using a current value of the electrode unit 123 due to the microbial particles captured by the electrode unit 123.

In one embodiment, the controller may include at least one processor or a microprocessor or may be a part of the processor. Further, the controller may be referred to as a communication processor (CP). The controller may control the operation of the microorganism detection apparatus 100 according to various embodiments of the present disclosure.

Referring to FIG. 1, the microorganism detection apparatus 100 may include the concentration unit 110 and the detection unit 120. In various embodiments of the present disclosure, since the components described in FIG. 1 are not essential, the microorganism detection apparatus 100 may be implemented with more or fewer components than those described in FIG. 1.

Figure 2A:
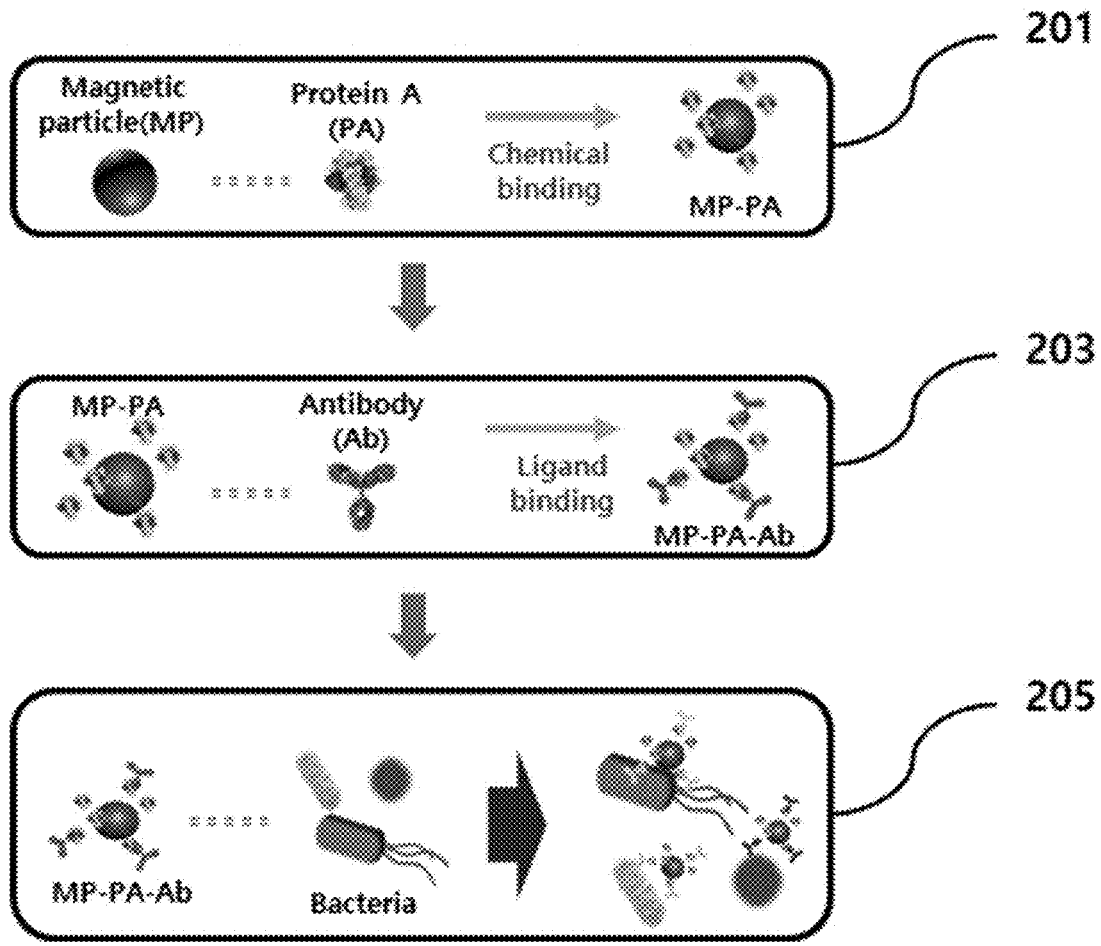
FIG. 2A is a view illustrating a method of synthesizing microorganisms and magnetic particles according to one embodiment of the present disclosure.
Figure 2B:
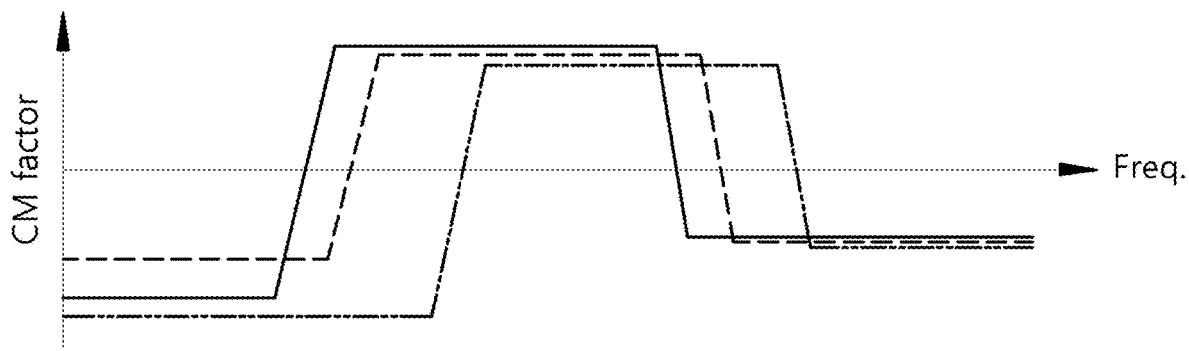
FIG. 2B is a multi-species microbial Clausius-Mossotti (CM) factor graph according to one embodiment of the present disclosure.

FIG. 2A is a view illustrating a method of synthesizing the magnetic particles and the microorganisms according to one embodiment of the present disclosure. FIG. 2B is a Clausius-Mossotti (CM) factor graph of the microorganisms combined with the magnetic particles according to one embodiment of the present disclosure.

Referring to FIG. 2A, operation 5201 is an operation of chemically binding magnetic particles MP and protein particles (for example, protein A (PA)). Operation 5203 is an operation of ligand-binding the magnetic particles MP-PA combined with the protein particles and an antibody Ab. Operation 5205 is an operation of binding the microbial particles and the magnetic particles MP-PA-Ab combined with the protein particles and the antibody.

In this case, referring to FIG. 2B, it can be identified that the microbial particles not combined with the latex particles and combined with the magnetic particles exhibit similar CM factors, and thus it is difficult to separate and detect the microbial particles according to microbial species using a frequency condition.

Figure 3A:
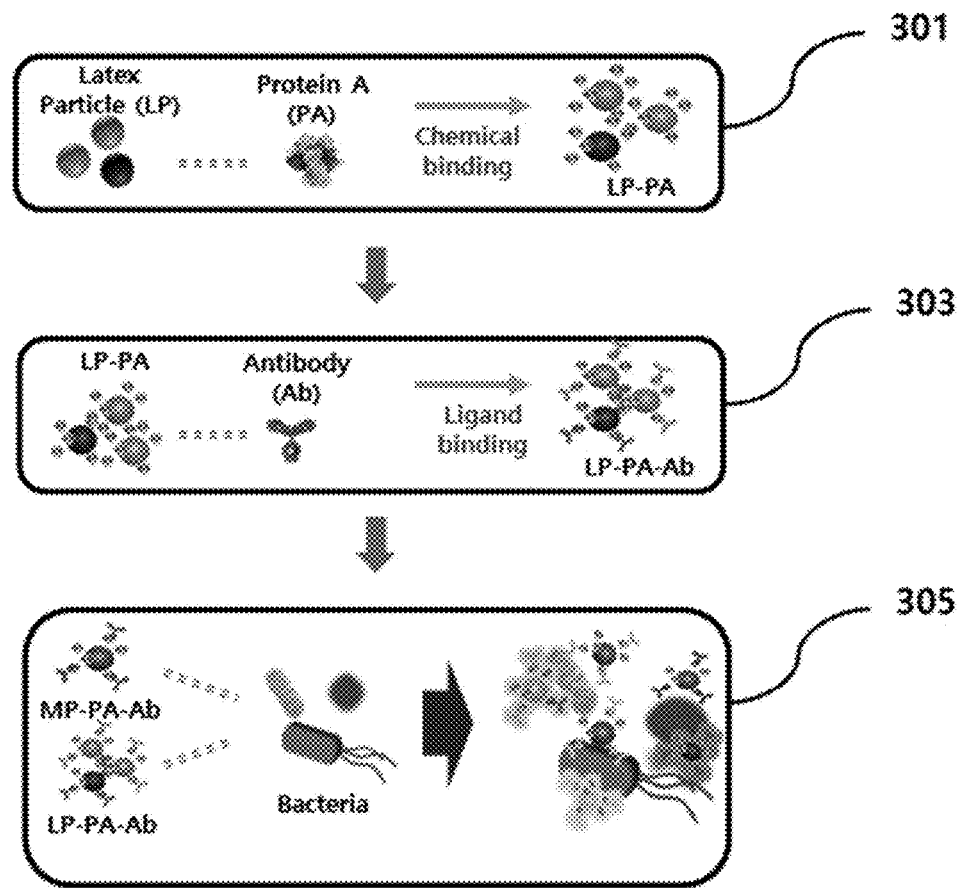
FIG. 3A is a view illustrating a method of synthesizing microorganisms and latex particles according to one embodiment of the present disclosure.
Figure 3B:
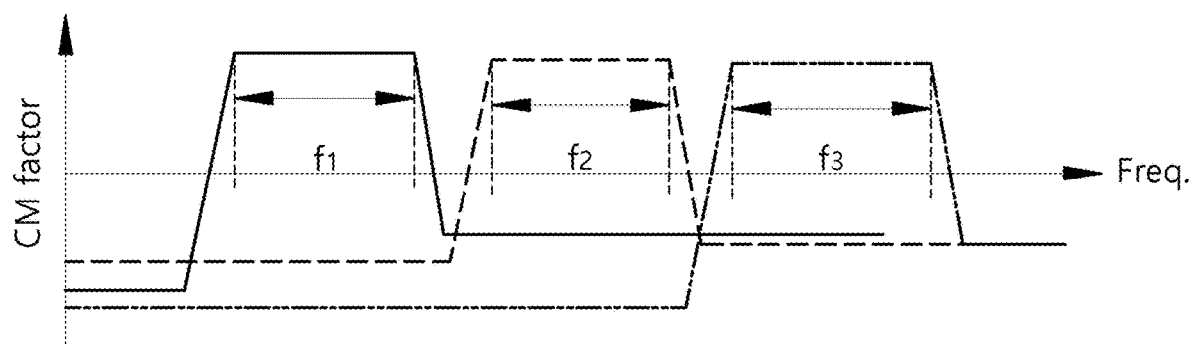
FIG. 3B is a latex particle CM factor graph according to one embodiment of the present disclosure.

FIG. 3A is a view illustrating a method of synthesizing the latex particles and the microorganisms according to one embodiment of the present disclosure. FIG. 3B is a CM factor graph of the microorganisms combined with the latex particles according to one embodiment of the present disclosure.

Referring to FIG. 3A, operation 5301 is an operation of chemically binding latex particles LP and the protein particles (for example, protein A (PA)). Operation 5303 is an operation of ligand-binding the latex particles LP-PA combined with the protein particles and an antibody Ab. Operation 5305 is an operation of binding the microbial particles and the latex particles LP-PA-Ab combined with the protein particles and the antibody.

Referring to FIG. 3B, when the latex particles are synthesized, different CM factors are exhibited according to the species of the microbial particles, and accordingly, the electrode unit 123 may capture different species of the microbial particles using the frequency condition. Further, a concentration of the microbial particles according to the species may be detected by signal analysis of the electrode unit 123.

Figure 4A:
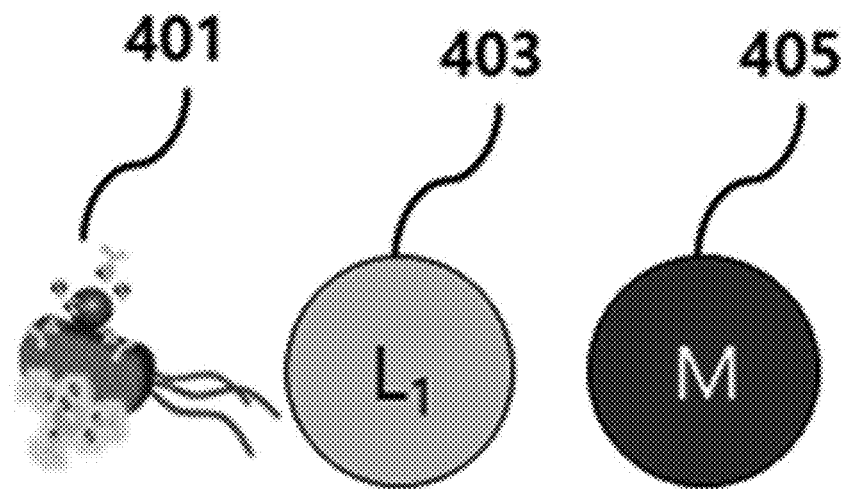
FIGS. 4A to 4C are views illustrating coupling of microbial particles according to one embodiment of the present disclosure.
Figure 4B:
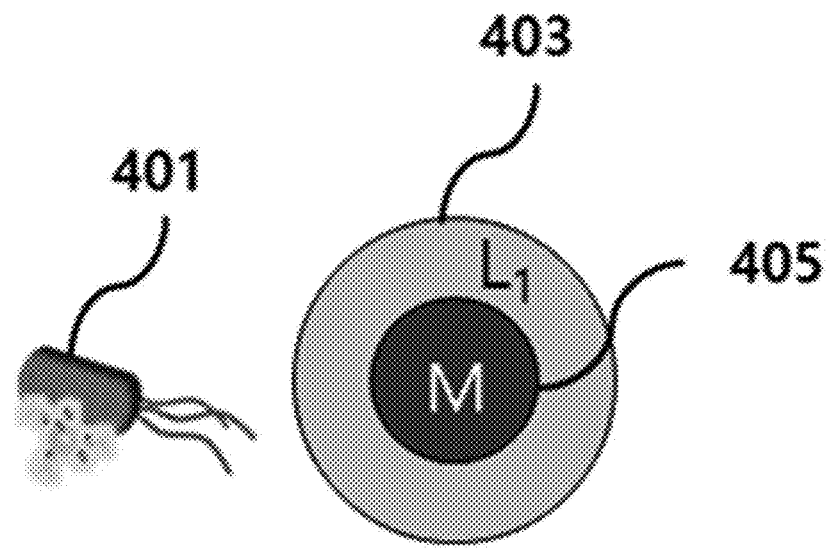
Figure 4C:
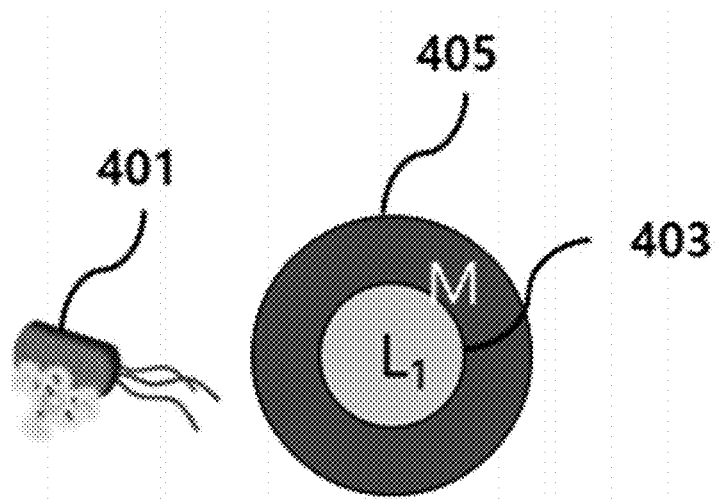

FIGS. 4A to 4C are views illustrating coupling of microbial particles according to one embodiment of the present disclosure.

Referring to FIG. 4A, latex particles 403 ($L_1$) may be synthesized with microbial particles 401 independently of magnetic particles 405 (M).

Referring to FIG. 4B, particles obtained by synthesizing the latex particles 403 ($L_1$) (for example, a polymer material) on the outside of the magnetic particles 405 (M) may be synthesized with the microbial particles 401. Referring to FIG. 4C, particles obtained by synthesizing the latex particles 403 ($L_1$) inside the magnetic particles 405 (M) may be synthesized with the microbial particles 401.

In the embodiment, various types of latex particles $L_1$, $L_2$, . . . , $L_n$ may be used depending on the type of microorganism. Accordingly, the microbial particles 401 may be captured and detected by the electrode unit 123 using characteristics of the latex particles 403 ($L_1$).

Figure 5:
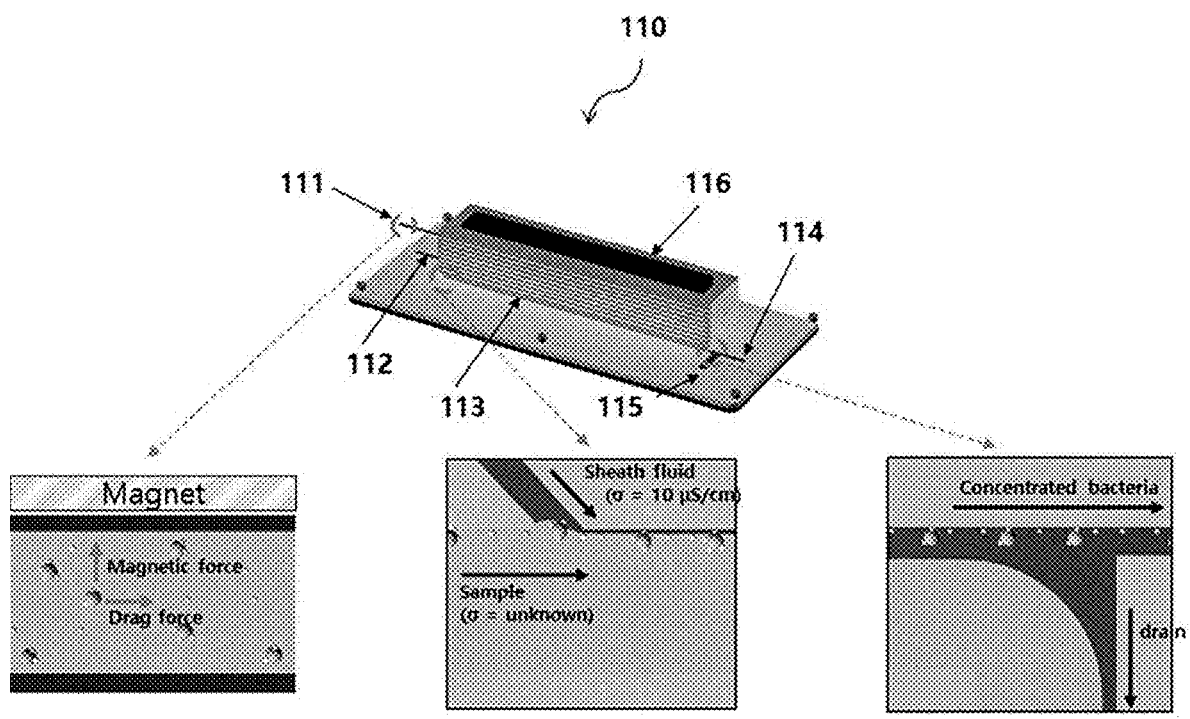
FIG. 5 is a view illustrating the concentration of the microbial particles by a concentration unit according to one embodiment of the present disclosure.

FIG. 5 is a view illustrating the concentration of the microbial particles by the concentration unit 110 according to one embodiment of the present disclosure.

Referring to FIG. 5, the concentration channel 113 may be wound around the magnetic member 116 of the concentration unit 110 in a three-dimensional shape. In this case, the magnetic member 116 may generate a magnetic force which acts on the magnetic particles combined with the microbial particles injected through the first injection unit 111. Accordingly, the microbial particles may move along one side surface of the concentration channel 113 by the magnetic force acting on the magnetic particles.

Further, the microbial particles moving along the one side surface of the concentration channel 113 may move to the sheath solution injected through the second injection unit 112. In this case, since the electrical conductivity of a solution should be kept constant to measure a change of the signal due to the microbial particles captured by the electrode unit 123 of the detection unit 120, for this purpose, the electrical conductivity of the solution is kept constant using the sheath solution, and thus an environment for capturing and detecting the microbial particles may be provided.

Thereafter, the first discharge unit 114 may transfer, to the detection unit 120, the sheath solution containing the microbial particles combined with the latex particles and the magnetic particles. The second discharge unit 115 may discharge the sample solution to the outside.

In this case, most of the sample fluid that does not include microorganisms flows to the second discharge unit 115, and thus the flow velocity of the fluid may be significantly reduced. This may provide an environment in which, by lowering a drag force of the fluid, the microbial particles may be captured by the electrode unit 123 by the DEP force.

In the embodiment, the concentration unit 110 may be manufactured of a polyethylene tube and a polydimethylsiloxane (PDMS) channel using soft-lithography.

Figure 6A:
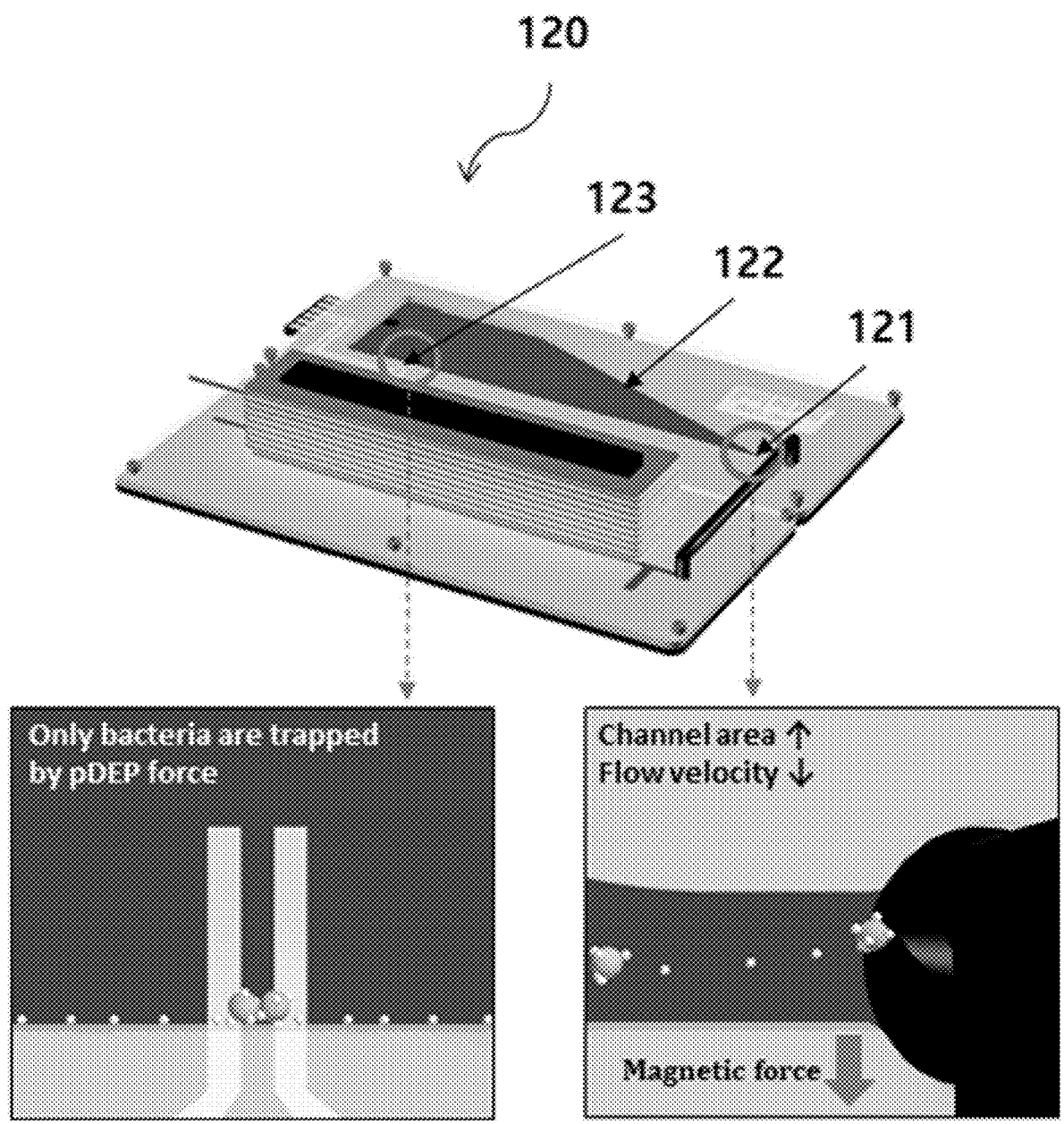
FIGS. 6A and 6B are views illustrating the detection of the microbial particles by a detection unit according to one embodiment of the present disclosure.
Figure 6B:
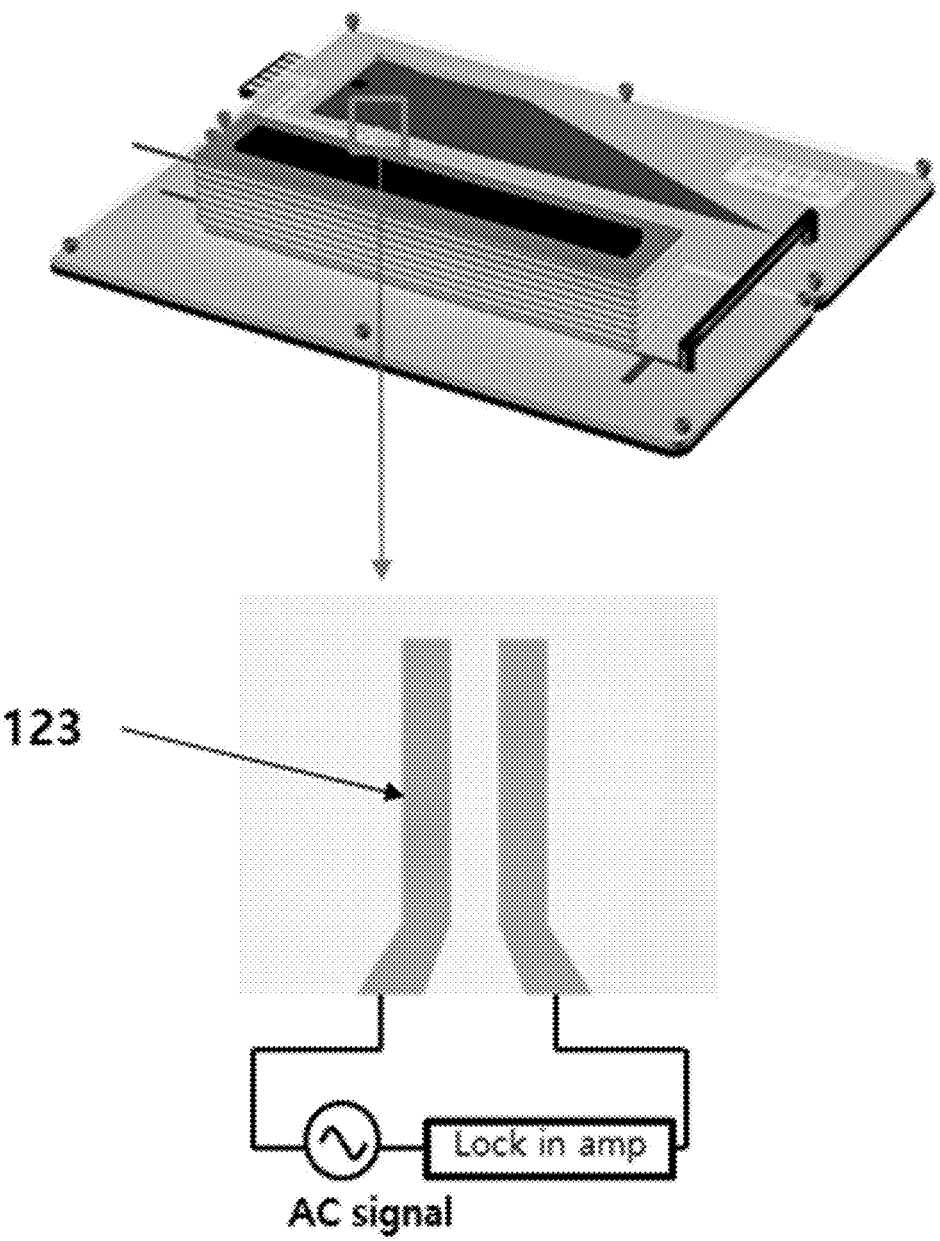
Figure 7A:
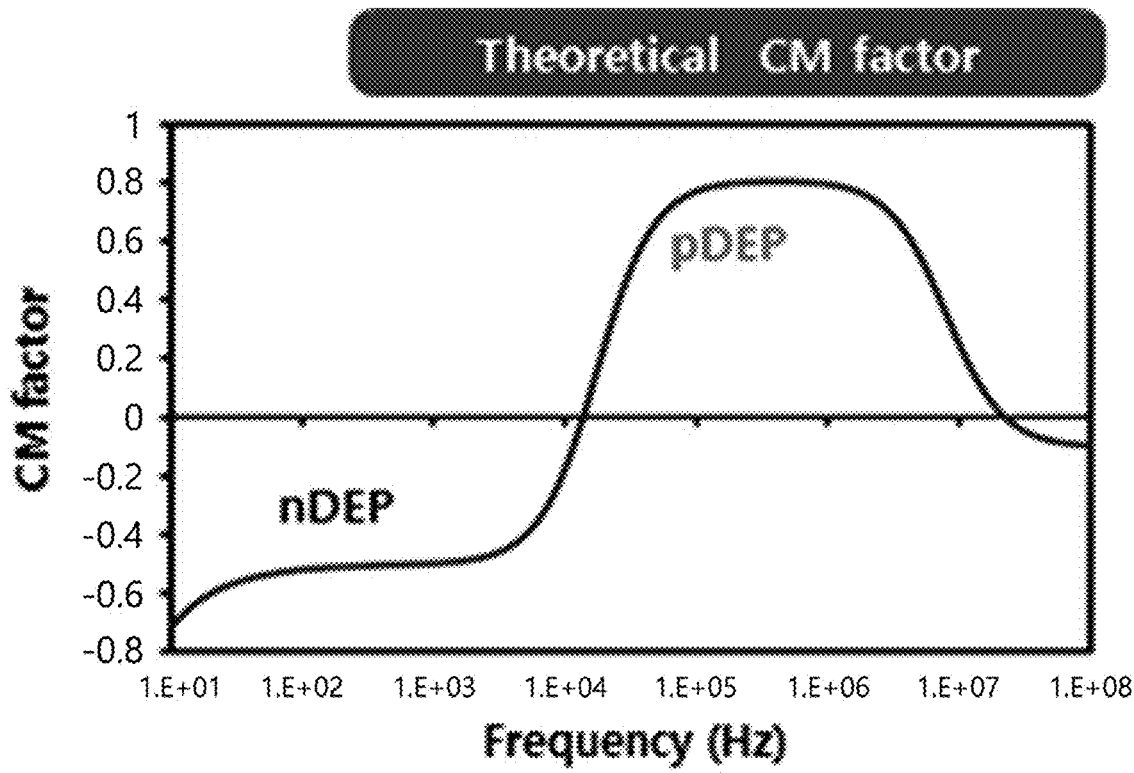
FIG. 7A is a microbial CM factor graph according to one embodiment of the present disclosure.
Figure 7B:
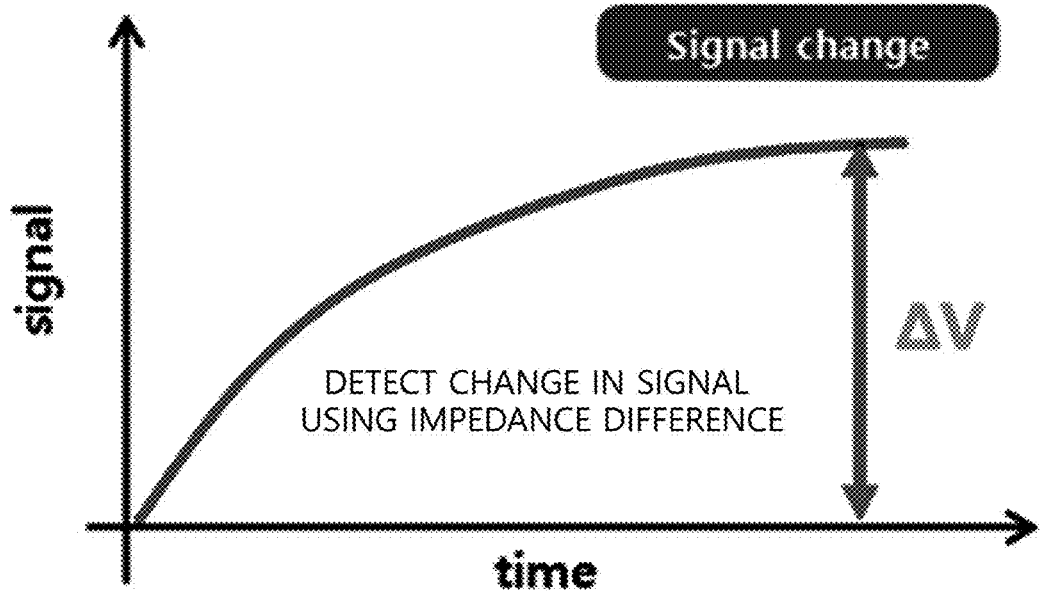
FIG. 7B is an electrical signal change graph according to the capture of microorganisms in an electrode unit according to one embodiment of the present disclosure.

FIGS. 6A and 6B are views illustrating the detection of the microbial particles by a detection unit according to one embodiment of the present disclosure. FIG. 7A is a CM factor graph of the microorganisms by the electrode unit according to one embodiment of the present disclosure. FIG. 7B is an electrical signal change graph by the electrode unit according to one embodiment of the present disclosure.

Referring to FIGS. 6A and 6B, the microorganisms combined with the latex particles and the magnetic particles are injected through the injection unit 121, and the microorganisms may move along the one side surface of the detection channel 122 by the magnetic force acting on the magnetic particles through the magnetic member 116.

Further, the electrode unit 123 may have the AC signal applied thereto and generate the DEP force corresponding to the latex particles according to the frequency of the AC signal, thereby capturing the microbial particles.

Referring to FIG. 7A, the microorganisms exhibit a CM factor according to a frequency and may be captured by the electrode unit using the frequency condition of an area showing a positive DEP force (pDEP force). Likewise, the microorganisms may be captured and detected by the electrode unit 123 using the DEP force corresponding to the latex particles combined with the microorganisms. In this case, the frequency condition showing the pDEP force is different according to characteristics of the latex particles combined with the microorganisms, and a variety of microorganisms may be captured and detected by the electrode unit using the frequency condition corresponding to the latex particles.

Referring to FIG. 7B, since the microbial particles have a higher admittance than the solution, the microbial particles are captured by the electrode unit 123, and thus a current between the two electrodes may increase. A concentration of the microbial particles may be detected using a change in signal according to such capture of the microbial particles.

Figure 8A:
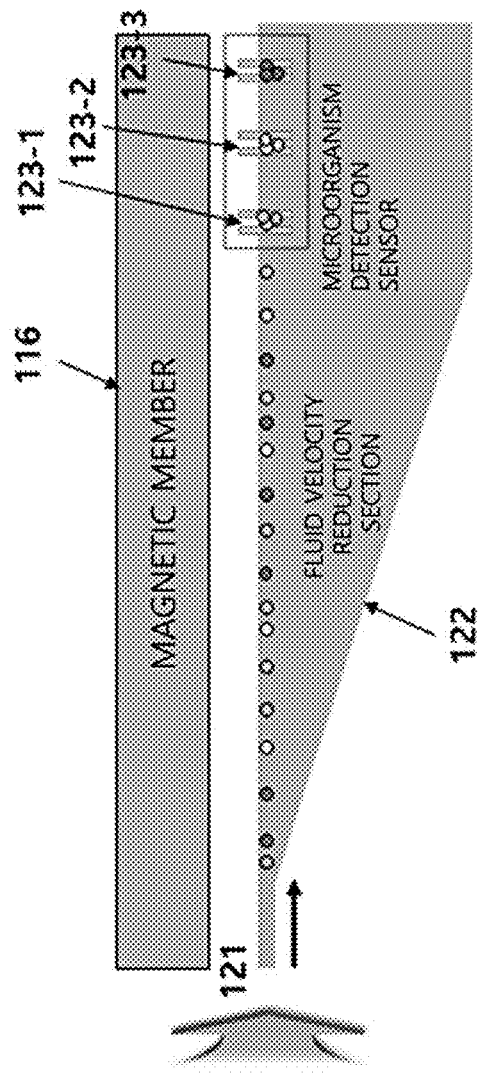
FIGS. 8A and 8B are views illustrating the detection of multi-species microbial particles by the detection unit according to one embodiment of the present disclosure.
Figure 8A:
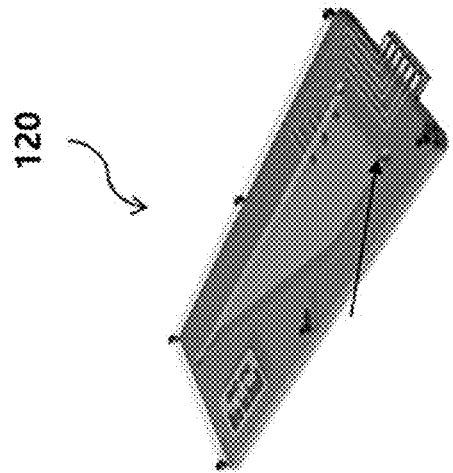
Figure 8B:
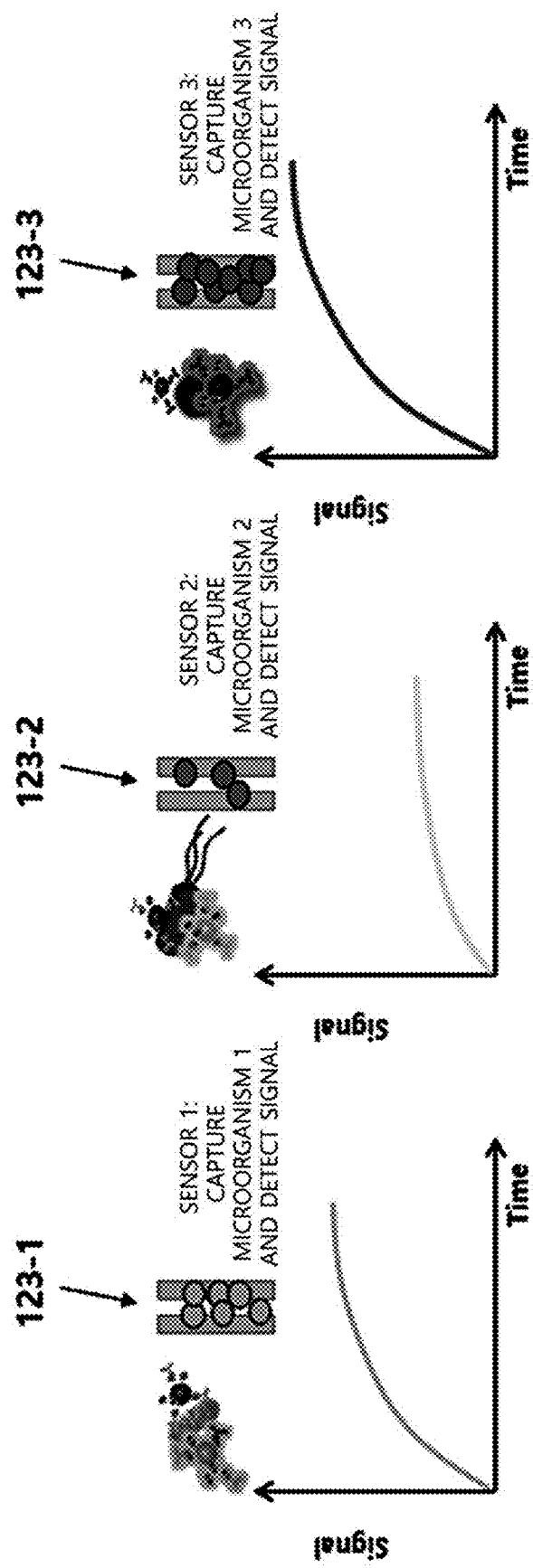

FIGS. 8A and 8B are views illustrating the detection of multi-species microbial particles by the detection unit according to one embodiment of the present disclosure.

Referring to FIGS. 8A and 8B, one end of the detection channel 122 may be coupled to the injection unit 121, and the other end of the detection channel 122 may be coupled to the electrode unit 123. In this case, the width of the detection channel 122 may increase in a direction from the one end to the other end of the detection channel 122.

In this way, since the width of the detection channel 122 is designed to become gradually wider, the flow velocity of the fluid moving through the detection channel 122 may gradually decrease. By reducing the drag force applied to the microorganisms by reducing the flow velocity of the fluid, microorganism capture efficiency using the DEP force can be improved.

In the embodiment, at least one electrode unit may be manufactured, and when the electrode unit is manufactured as a plurality of electrode units 123-1 to 123-3 as illustrated in FIGS. 8A and 8B, different microbial particles are captured by the respective electrode units, and thus various microbial particles can be detected by type.

In detail, by combining the latex particles exhibiting different DEP characteristics with the microbial particles, different types of microbial particles are captured for the respective electrode units 123-1 to 123-3 using the frequency condition corresponding to the occurrence of the DEP forces of the latex particles, and thus a change in the intensity of the signal can be measured.

Figure 9:
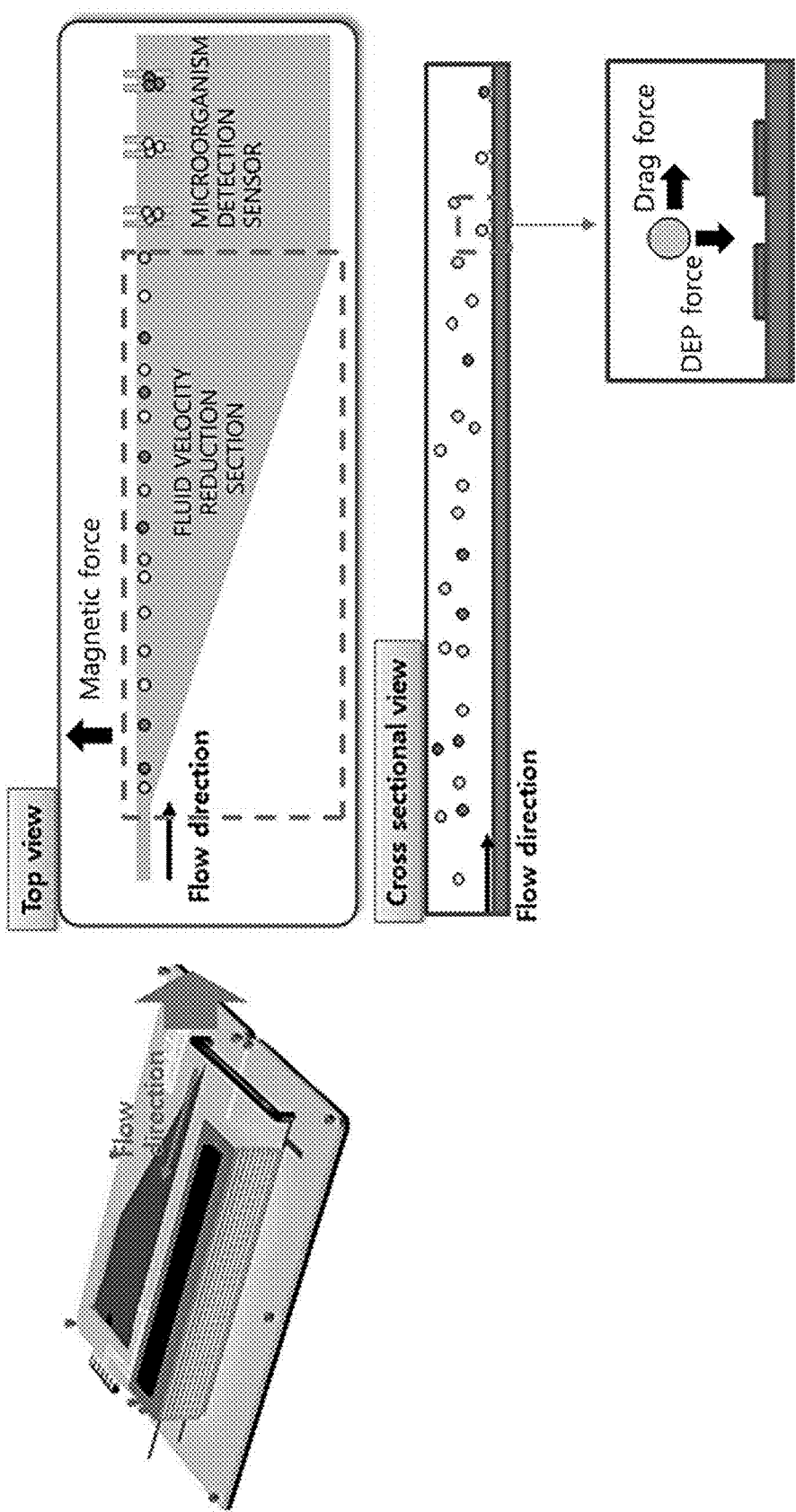
FIG. 9 is a view illustrating the behavior and dielectrophoresis (DEP) force of particles in a fluid channel according to one embodiment of the present disclosure.

FIG. 9 is a view illustrating the DEP force according to one embodiment of the present disclosure.

Referring to FIG. 9, the microbial particles are combined with the latex particles and the magnetic particles and may move along one side surface of the detection channel 122 by a magnetic force acting on the magnetic particles through the magnetic member 116.

In this case, for example, the magnetic force acting on the magnetic particles combined with the microorganism particles may be expressed as [Equation 1].

$$\vec{F}_{Mag} = 2\pi\mu_m K(\mu_m,\mu_p)a^3 \nabla |\vec{H}_{ext}(\vec{r}_0)^2|$$ [Equation 1]

Here, $\vec{F}_{Mag}$ denotes a magnetic force, $\mu_m$ denotes medium permeability, $K(\mu_m, \mu_p)$ denotes a CM factor, $\mu_p$ denotes particle permeability, a denotes a particle radius, $\vec{H}_{ext}$ denotes a magnetic field, and $\vec{r}_0$ denotes a position vector.

Since the width of the detection channel 122 is designed to become gradually wider, the fluid velocity moving through the detection channel 122 may gradually decrease.

In this case, forces acting on the microbial particles in the detection channel 122 for reducing the flow velocity may include the drag force and the DEP force. Here, the drag force increases in proportion to the flow velocity, and when the drag force is high, the microbial particles cannot be captured by the DEP force and may flow along the fluid.

Thus, a reduction in the drag force may be required to capture the microbial particles using the DEP force. In this case, in the detection channel 122 according to the present disclosure, the width of the corresponding channel may gradually increase to reduce the fluid velocity, and accordingly, the drag force can be reduced.

For example, the drag force and the DEP force according to the width structure of the detection channel 122 may be expressed as in [Equation 2] and [Equation 3], respectively.

$$\vec{F}_d = 6\pi\eta a \vec{U}$$ [Equation 2]

Here, $\vec{F}_d$ denotes a drag force, $\eta$ denotes the viscosity of a medium, a denotes a particle radius, and $\vec{U}$ denotes a velocity of fluid flow.

$$F_{DEP} = 2\pi\varepsilon_m r^3 \text{Re}[\underline{K}(\omega)] \cdot \nabla |\underline{E}(r)|^2$$ [Equation 3]

Here, $F_{DEP}$ denotes a DEP force, $\varepsilon_m$ denotes the permittivity of a medium, r denotes a particle radius, $K(\omega)$ denotes a CM factor, and $\underline{E}(r)$ denotes an electric field.

According to one embodiment of the present disclosure, the microbial particles are detected using the DEP force corresponding to the latex particles combined with the microbial particles, a cultivation process is not required, and thus a detection time is fast. Further, the concentration of the microbial sample through concentration is increased, and thus accurate measurement can be achieved.

Further, according to one embodiment of the present disclosure, the number of microorganisms can be detected regardless of the type of microorganisms according to a method of synthesizing the microorganism particles.

The effects of the present disclosure are not limited to the above-described effects, and the potential effects expected by the technical features of the present disclosure can be clearly understood from the following description.

The above description is merely illustrative of the technical spirit of the present disclosure, and those skilled in the part may derive various changes and modifications without departing from the essential features of the present disclosure.

Thus, the embodiments disclosed in the present specification are not intended to limit the technical spirit of the present disclosure but are intended to describe the present disclosure, and the scope of the present disclosure is not limited by these embodiments.

The scope of protection of the present disclosure should be interpreted by the appended claims, and all technical ideas within the scope equivalent thereto should be understood as being included in the scope of the present disclosure.

What is claimed is:

1. A microorganism detection apparatus comprising:
   a detection unit that detects microbial particles using a dielectrophoresis (DEP) force corresponding to latex particles combined with the microbial particles,
   wherein the detection unit comprises:
   an injection unit;
   a detection channel having a first section and a second section;
   a plurality of electrode units positioned on the second section along one side of the detection channel, and each electrode unit comprising a pair of adjacent electrodes; and
   wherein the injection unit injects a solution containing the latex particles combined with the microbial particles to the detection channel,
   wherein the latex particles combined with the microbial particles move on the detection channel,
   wherein the first section of the detection channel has a first end coupled to the injection unit and a second end coupled to the second section of the detection channel, and the first section of the detection channel has a width that gradually increases in a direction from the first end to the second end, wherein the second section of the detection channel has a constant width, wherein the electrode unit is applied with an alternating current (AC) signal having a particular frequency, which corresponds to a frequency that makes the latex particles combined with the microbial particles to show a positive DEP force and captures the microbial particles showing Clausius-Mossotti (CM) factor corresponding to the latex particles by forming the positive DEP force corresponding to the latex particles according to the frequency of the AC signal, and wherein the captured microbial particles, among the microbial particles do not flow along the solution but are captured in between each pair of adjacent electrodes of each electrode unit.

2. The microorganism detection apparatus of claim 1, wherein the detection unit further includes a control unit that calculates a concentration of microorganisms included in the captured microbial particles, based on a current value in between the pair of adjacent electrodes of each electrode unit.

3. The microorganism detection apparatus of claim 2, wherein the control unit comprises:
a processor that calculates the concentration of microorganisms by checking an increment of a current amount between the pair of adjacent electrodes.

4. The microorganism detection apparatus of claim 2, wherein the control unit detects a higher concentration of the microorganisms included in the captured microbial particles as a higher current value detected in between the pair of adjacent electrodes of one of the plurality of electrode units.

5. The microorganism detection apparatus of claim 1, wherein the microbial particles are combined with the latex particles and magnetic particles and move due to a magnetic force acting on the magnetic particles.

6. The microorganism detection apparatus of claim 1, further comprising:
a concentration unit that concentrates the microbial particles combined with the latex particles and transfers the concentrated microbial particles to the detection unit.

7. The microorganism detection apparatus of claim 6, wherein the concentration unit further includes:
a magnet member that generates a magnetic force which acts on magnetic particles combined with the microbial particles, and wherein the microbial particles move due to the magnetic force acting on the magnetic particles.

8. The microorganism detection apparatus of claim 7, wherein the magnet member generates, on the magnetic particles, the magnetic force that is expressed as Equation 1:

$$\vec{F}_{Mag}=2\pi\mu_m K(\mu_m,\mu_p)\alpha^3 \nabla |\vec{H}_{ext}(\vec{r}_0)^2|$$ [Equation 1]

where $\vec{F}_{Mag}$ denotes a magnetic force, $\mu_m$ denotes medium permeability, $K(\mu_m, \mu_p)$ denotes a CM factor, $\mu_p$ denotes particle permeability, $\alpha$ denotes a particle radius, $\vec{H}_{ext}$ denotes a magnetic field, and $\vec{r}_0$ denotes a position vector.

9. The microorganism detection apparatus of claim 7, wherein the magnetic member has a constant width and is positioned in parallel with a longitudinal direction of the detection channel.

10. The microorganism detection apparatus of claim 1, wherein the plurality of electrode units comprises:
a first pair of electrodes, which are applied with a first AC signal having a first frequency, and capture a first type of microbial particles combined with a first type of latex particles exhibiting a first DEP characteristic;
a second pair of electrodes, which are applied with a second AC signal having a second frequency, and capture a second type of microbial particles combined with a second type of latex particles exhibiting a second DEP characteristic; and
a third pair of electrodes, which are applied with a third AC signal having a third frequency, and capture a third type of microbial particles combined with a third type of latex particles exhibiting a third DEP characteristic.

11. The microorganism detection apparatus of claim 10, wherein the detection unit further includes a control unit that:
calculates a first concentration of microorganisms included in the microbial particles captured in between the first pair of electrodes, based on a first current value in between the first pair of electrodes;
calculates a second concentration of microorganisms included in the microbial particles captured in between the second pair of electrodes, based on a second current value in between the second pair of electrodes; and
calculates a third concentration of microorganisms included in the microbial particles captured in between the third pair of electrodes, based on a third current value in between the third pair of electrodes.

* * * * *